United States Patent
Tsuchiya

(10) Patent No.: US 10,183,504 B2
(45) Date of Patent: Jan. 22, 2019

(54) IMAGE PROCESSING DEVICE, IMAGE PROCESSING SYSTEM, AND METHOD OF FORMING IMAGE

(71) Applicant: Yuki Tsuchiya, Kanagawa (JP)

(72) Inventor: Yuki Tsuchiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 14/982,595

(22) Filed: Dec. 29, 2015

(65) Prior Publication Data
US 2016/0193858 A1 Jul. 7, 2016

(30) Foreign Application Priority Data

Jan. 5, 2015 (JP) ................................. 2015-000121
Dec. 17, 2015 (JP) ................................. 2015-246446

(51) Int. Cl.
| B41J 11/00 | (2006.01) |
| B29C 64/112 | (2017.01) |
| B33Y 50/02 | (2015.01) |
| B29C 64/393 | (2017.01) |
| B29C 64/386 | (2017.01) |
| B33Y 10/00 | (2015.01) |
| B41J 2/21 | (2006.01) |

(52) U.S. Cl.
CPC .......... *B41J 11/002* (2013.01); *B29C 64/112* (2017.08); *B29C 64/386* (2017.08); *B29C 64/393* (2017.08); *B33Y 10/00* (2014.12); *B33Y 50/02* (2014.12); *B41J 2/2114* (2013.01); *B41J 2/2117* (2013.01)

(58) Field of Classification Search
CPC ... B29C 64/00; B29C 64/112; B29C 67/0059; B29C 64/386; B29C 64/393; B33Y 10/00; B33Y 50/02
USPC ........................................ 425/174.4; 264/308
See application file for complete search history.

(56) References Cited

U.S. PATENT DOCUMENTS 6,305,769 B1 * 10/2001 Thayer ................ B29C 67/0059
347/1
2003/0112282 A1 * 6/2003 de Pena ................ B41J 2/2132
347/5

(Continued)

FOREIGN PATENT DOCUMENTS

| JP | 2012-166372 | 9/2012 |
| JP | 2012-254613 | 12/2012 |

*Primary Examiner* — Seyed Masoud Malekzadeh
*Assistant Examiner* — Lawrence D. Hohenbrink, Jr.
(74) *Attorney, Agent, or Firm* — Harness, Dickey & Pierce P.L.C.

(57) ABSTRACT

An image processing device causing an image forming apparatus to form a laminate image including a recording unit to discharge a liquid to a recording medium, a curing unit to cure the liquid discharged by the recording unit, and a drive unit, includes a scanning control unit to control the drive unit to move the recording unit and the curing unit of the image forming apparatus in a sub-scanning direction and scan the recording unit and the curing unit in a main scanning direction multiple times; and a matte lamination control unit to cause the recording unit of the image forming apparatus to form the laminate image on an image forming area being a part of an entire image forming area by scanning the recording unit in the main scanning direction in an amount of lamination and move the recording unit in the sub-scanning direction.

20 Claims, 17 Drawing Sheets

(56) References Cited

U.S. PATENT DOCUMENTS

| | | | |
|---|---|---|---|
| 2011/0206429 A1* | 8/2011 | Terao | G03G 15/2064 399/341 |
| 2014/0035979 A1* | 2/2014 | Tamura | B41J 2/07 347/11 |
| 2016/0101568 A1* | 4/2016 | Mizes | B33Y 10/00 264/40.1 |

* cited by examiner

FIRST SCANNING
(FIRST LAYER)

FIRST SCANNING
(SECOND LAYER)

FIRST SCANNING
(THIRD LAYER)

SECOND SCANNING
(FIRST LAYER)

IMAGE PROCESSING DEVICE, IMAGE PROCESSING SYSTEM, AND METHOD OF FORMING IMAGE

CROSS-REFERENCE TO RELATED APPLICATIONS

This patent application is based on and claims priority pursuant to 35 U.S.C. § 119 to Japanese Patent Application Nos. 2015-000121 and 2015-246446 on Jan. 5, 2015 and Dec. 17, 2015, respectively, in the Japan Patent Office, the entire disclosures of which are hereby incorporated by reference herein.

BACKGROUND

Technical Field

The present invention relates to an image processing device, an image processing system, and a method of forming an image.

Background Art 3D modeling methods of producing a 3D image or an 3D object using an inkjet method are known, which includes discharging an ink, drying or curing the ink to form a layer, and laminating the layers (additive manufacturing). In one of the known image forming methods using the inkjet method, 3D objects are manufactured by repeating forming, curing, and laminating layers. Hereinafter, "image" includes a 3D image and a 3D object.

In this method, for example, photocurable ink (for example, ultraviolet ink) that is curable upon application of ultraviolet ray is discharged from a nozzle onto a medium (object on which an image is formed) and ultraviolet (UV) ink dots formed on the medium are cured by irradiation of light to fix the UV ink dots on the medium.

Output of images having a low gloss value (for example, 7 or less for 60 degree gloss) to obtain a matte texture has been demanded in a printing method repeating forming, curing, and laminating layers using photocurable ink.

SUMMARY

According to the present invention, provided is an image processing device causing an image forming apparatus to form a laminate image including a recording unit to discharge a liquid to a recording medium, a curing unit to cure the liquid discharged by the recording unit, and a drive unit. The image processing device includes a scanning control unit to control the drive unit to move the recording unit and the curing unit of the image forming apparatus in a sub-scanning direction and scan the recording unit and the curing unit in a main scanning direction multiple times; and a matte lamination control unit to cause the recording unit of the image forming apparatus to form the laminate image on an image forming area being a part of an entire image forming area by scanning the recording unit in the main scanning direction in an amount of lamination and move the recording unit in the sub-scanning direction.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
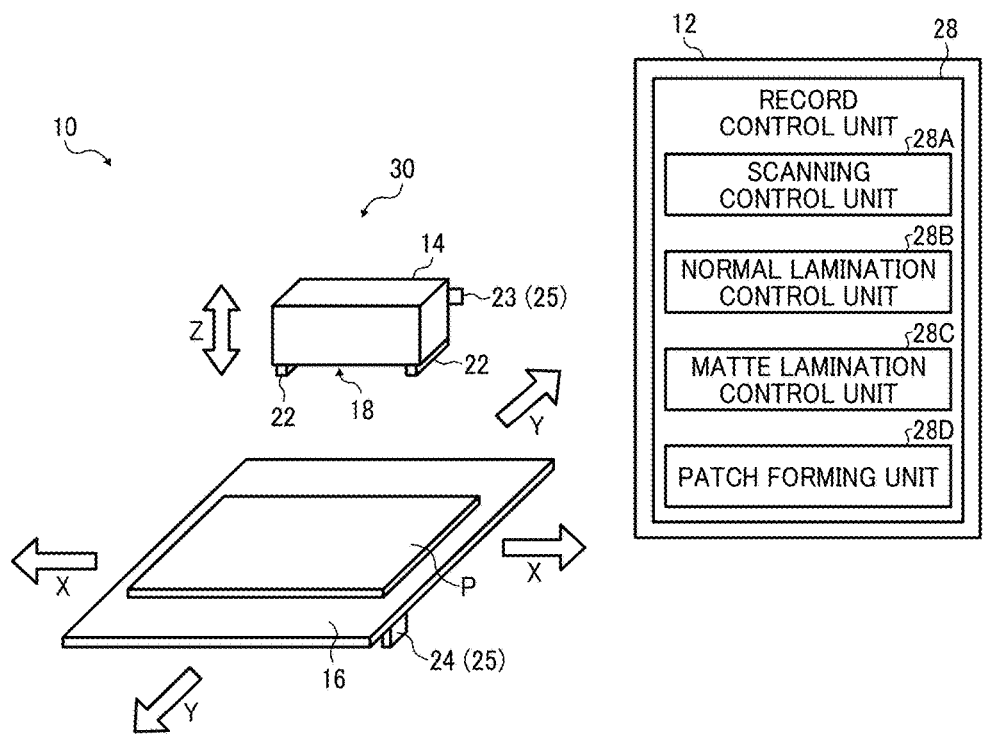
FIG. 1 is a schematic diagram illustrating the configuration of an image processing system relating to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Preferred embodiments of the present invention are described in detail below with reference to the accompanying drawings. Although the presently preferred embodiments of the present invention are described with various technically preferred limitations, the scope of the invention should not be construed as limited by the embodiments discussed below. It should not be construed that all of elements of the embodiments discussed below are essential to the invention unless specifically stated as such The configurations relating to the present disclosure are described based on embodiments illustrated in the accompanied drawings (FIGS. 1 to 24).

Image Processing System

FIG. 1 is a diagram illustrating an example of an image processing system 10. The image processing system 10 includes an image processing device 12 and the image forming apparatus 30. The image processing device 12 and the image forming apparatus 30 are communicatively connected to each other. The image forming apparatus in a broad sense represents any of the image processing device 12 including the image forming apparatus 30, simply the image processing device 12 itself, and simply the image forming apparatus 30 itself The image forming apparatus 30 includes a recording unit 14, an operation stage 16, and a drive unit 25.

The recording unit 14 is an inkjet type carriage having multiple heads 18, each having multiple nozzles and records dots by discharging droplets through the nozzles of the head 18. The nozzle is provided on surface of the recording unit 14 facing the operation stage 16.

The droplet includes an ink droplet and an additional droplet. The ink droplet contains a droplet (color ink) of an ink containing a colorant for use in image forming.

The additional droplet has a color having no impact on an image. The additional droplet is, for example, white or transparent (clear). In addition, the additional droplet may have a similar color to that of the support (base) P as object on which an image is formed. The support P is an object on which an image of the ink droplet is formed. The support P is, for example, a recording medium. In addition, the support P itself can be formed on the operation stage 16 by discharging droplets utilizing an inkjet method.

The ink droplet and the additional droplet are curable on stimulus. The stimulus is, for example, light (ultraviolet, infrared, etc.), heat, electricity, etc. In this embodiment, a case in which the ink droplet and the additional droplet are ultraviolet curable is described. The ink droplet and the additional droplet are not limited to ultraviolet curable.

The irradiator 22 is provided to the recording unit 14, disposed facing the operation stage 16.

The irradiator 22 irradiates the support P with light having a wavelength that cures the ink droplets or the additional droplets discharged through the nozzle. The irradiator 22 emits, for example, ultraviolet.

The operation stage 16 holds the support P. The drive unit 25 relatively moves the recording unit 14 and the operation stage 16 in the vertical direction (Z direction in FIG. 1), a main scanning direction X perpendicular to the vertical direction Z, and a sub-scanning direction Y perpendicular to the vertical direction Z and the main scanning direction X. In this embodiment, the plane made along the main scanning direction X and the sub-scanning direction Y corresponds to the XY plane in the operation stage 16 along the plane facing the recording unit 14.

The drive unit 25 includes a first drive unit 23 and a second drive unit 24. The first drive unit 23 moves the recording unit 14 in the vertical direction Z, the main scanning direction X, and the sub-scanning direction Y. The second drive unit 24 moves the operation stage 16 in the vertical direction Z, the main scanning direction X, and the sub-scanning direction Y. The image forming apparatus 30 may have a configuration having only one of the first drive unit 23 and the second drive unit 24.

Figure 2:
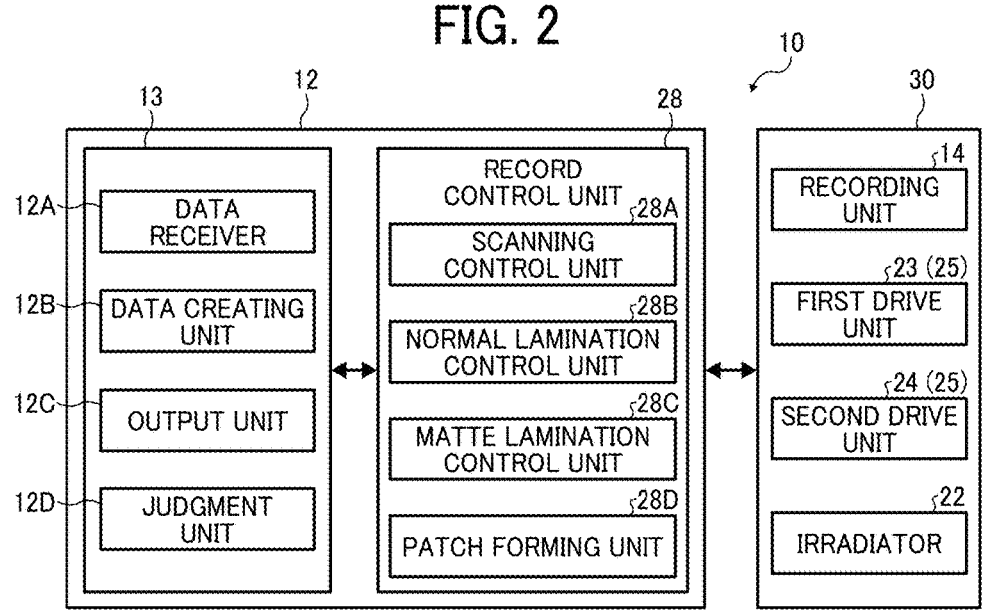
FIG. 2 is a block diagram of function of an image processing system relating to an embodiment of the present invention.

FIG. 2 is a function block diagram illustrating the image processing system 10. The image forming apparatus 30 includes the recording unit 14, the drive unit 25, and the irradiator 22.

The image processing device 12 includes a main control unit 13 and a record control unit 28. The main control unit 13 is a computer, which has a configuration including a central processing unit (CPU), etc. and controls the entire of the image processing device 12. The main control unit 13 may have a configuration including no general purpose CPU. For example, the main control unit 13 may be configured by a circuit, etc. The main control unit 13 is also a computer, which has a configuration including a central processing unit (CPU), etc. and can be the same computer as that of the main control unit 13 or separately provided.

The main control unit 13 includes a data receiver 12A, a data generating unit 12B, a data output unit 12C, and a determining unit 12D. Part or the entire of the functions of these data receiver 12A, the data generating unit 12B, the data output unit 12C, and the determining unit 12D can be performed by executing programs, i.e., software, by a processing device such as a CPU, hardware such as an integrated circuit (IC), or a combination of software and hardware.

The data receiver 12A receives image data. The image data are information about shapes, color, etc. of the image to be formed. The data receiver 12A acquires image data from an external device via a communication unit or from a recording device (such as memory) provided to the image processing device 12.

The data generating unit 12B executes data processing such as master processing about the image data received at the data receiver 12A.

The data output unit 12C outputs the image data generated at the data generating unit 12B to the image forming apparatus 30.

The record control unit 28 controls the recording unit 14, the drive unit 25, and the irradiator 22 of the image forming apparatus 30 in order to discharge the droplet 32 corresponding to each pixel from the head 18 in accordance with the image data generated at the data output unit 12C.

In addition, the record control unit 28 includes a scanning control unit 28A, a normal lamination control unit 28B, and matte lamination control unit 28C, which control image forming according to the multi-scanning method, the normal lamination method, and the matte lamination method described later, respectively. In addition, the record control unit 28 further includes a patch forming unit 28D to form the test chart described later.

The determining unit 12D determines whether to print an image according to the normal lamination method or the matte lamination method based on the information input into the determining unit 12D.

In this embodiment, the image processing system 10 includes the image processing device 12 and the image forming apparatus 30 communicatively connected with the image processing device 12 but the image processing device 12 may have a configuration including the image forming apparatus 30. In addition, in the configuration illustrated in FIG. 2 in which the image processing system 10 includes the image processing device 12 and the image forming apparatus 30, the image forming apparatus 30 may have a configuration including the record control unit 28, which receives the image data from the data output unit 12C of the image processing device 12.

Figure 3:
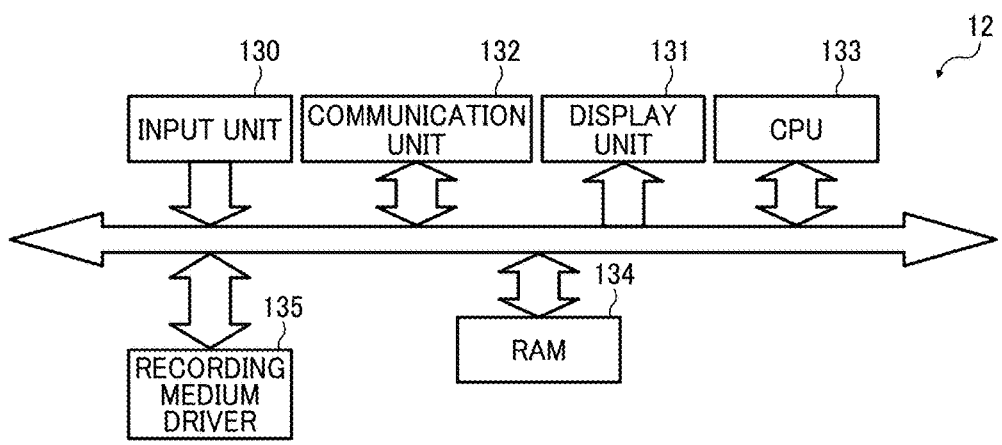
FIG. 3 is a diagram illustrating an example of the hardware configuration of an image processing device relating to an embodiment of the present invention.

Next, the hardware configuration of the image processing device 12 is described. FIG. 3 is a block diagram illustrating the hardware configuration of the image processing device 12. The image processing device 12 includes an input unit 130 to input data, a display unit 131 such as a display, a communication unit 132 to conduct data communication, a CPU 133 serving as a control unit to control the entire of the device, a RAM 134 used as the working area of the CPU 133, and a storage unit 135 to store various programs to operate the CPU 133.

The input unit 130 includes a keyboard having a carsor key, number keys, and various function keys, and a mouse and a slice pad to select a key on the display of the display unit 131. The input unit 130 is a user interface where a user provides an instruction of an operation to the CPU 133 and inputs data.

The display 131 is a cathode-ray tube (CRT), liquid crystal display (LCD), etc. and displays what corresponds to display data input from the CPU 133. The communication unit 132 is to execute data communication with an exterior, e.g., the image forming apparatus 30 with a communication interface.

The CPU 133 is a central processing unit to control the entire device according to the program stored in the storage unit 135. The CPU 133 is connected with the input unit 130, the display unit 131, the communication unit 132, the RAM 134, the storage unit 135, etc. to control data communication, read-out of application programs and read/write of various data by access to the memory, input of data and command, display, etc.

In addition, the CPU 133 sends out image data to form an image to the image forming apparatus 30 via the communication unit 132 based on the image data input from the input unit 130 or stored in the storage unit 135.

The RAM 134 has a work memory to store designated programs, input instructions, input data, and processing results and a display memory to temporarily store display data to be displayed on the display screen of the display unit 131, The storage unit 135 stores various programs and data such as an operating system program (e.g., operating system Windows™ of Microsoft Corporation) executable by the CPU 133 and a printer driver supported by the image forming apparatus 30. The storage unit 135 includes optical, magnetic, and electric recording media such as hard disks, CD-ROMs, and DVD-ROMs.

The various programs are stored in the storage unit 135 in data form the CPU 133 can read. In addition, the various programs may be recorded in the storage unit 135 in advance or stored in the storage unit 135 by downloading via a communication line such as the internet.

Image Forming Apparatus

The detail of the image forming apparatus 30 is described next. The image forming apparatus 30 forms images according to an optical modeling method including discharging ink (optically curable ink) containing a photocurable resin and irradiating the ink with light to cure the photocurable resin.

Recording Unit

Figure 4:
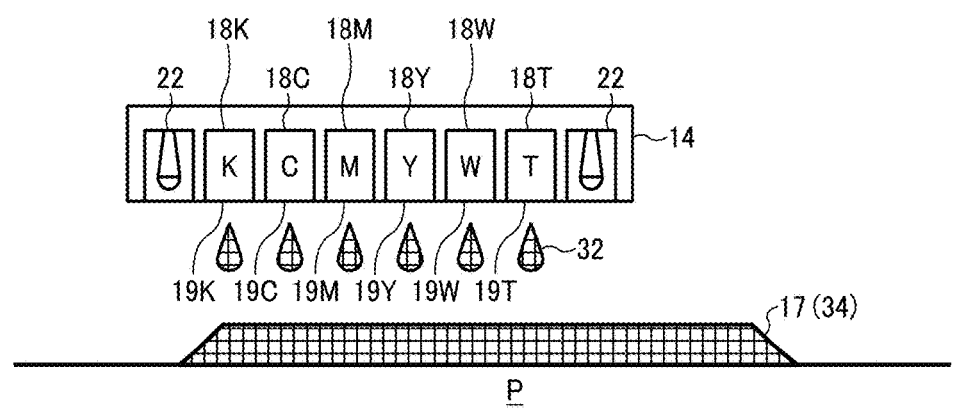
FIG. 4 is a schematic diagram illustrating an example of the recording unit of an image forming apparatus according to an embodiment of the present invention.

As illustrated in FIG. 4, the recording unit 14 in the image forming apparatus 30 is a carriage having multiple nozzles 19 arranged in a direction. Each of the nozzles 19 (19K, 19C, 19M, 19Y, 19W, and 19T) discharges ink droplets, additional droplets, or a liquid mixture thereof as the droplet 32. The nozzle 19 and the configuration to discharge the droplets are the same as those of known inkjet methods.

In this embodiment, a head 18K, a head 18C, a head 18M, a head 18Y, a head 18W, and a head 18T (which are representatively referred to as head 18) are arranged in a direction. The head 18K, the head 18C, the head 18M, the head 18Y, the head 18W, and the head 18T have the nozzle 19K, the nozzle 19C, the nozzle 19M, the nozzle 19Y, the nozzle 19W, and the nozzle 19T (which are representatively referred to as nozzle 19), respectively. The nozzle 19K discharges the ink droplets of black, the nozzle 19C discharges the ink droplets of cyan, the nozzle 19M discharges the ink droplets of magenta, the nozzle 19Y discharges the ink droplets of yellow, the nozzle 19W discharges the ink droplets of white, and the nozzle 19T discharges the ink droplets of transparent.

By discharging the droplet 32 from each of the nozzles 19, dots 34 corresponding to the droplet 32 are formed on the support P so that an image 17 is formed. In addition, by discharging and laminating the droplet 32, the dot 34 is laminated to form a 3D image 17.

In this embodiment, irradiators 22 are provided on both ends of the recording unit 14 in the arrangement direction of the head 18K, the head 18C, the head 18M, the head 18Y, the head 18W, and the head 18T. The droplet 32 discharged from each nozzle 19 is cured upon application of light emitted from the irradiator 22.

It is preferable to arrange the irradiator 22 near the nozzle 19. This arrangement of the irradiator 22 makes it possible to reduce the curing time to be taken from landing of the droplets 32 discharged from each nozzle 19 on the support P to curing. As a result, finer images can be formed.

Figure 5:
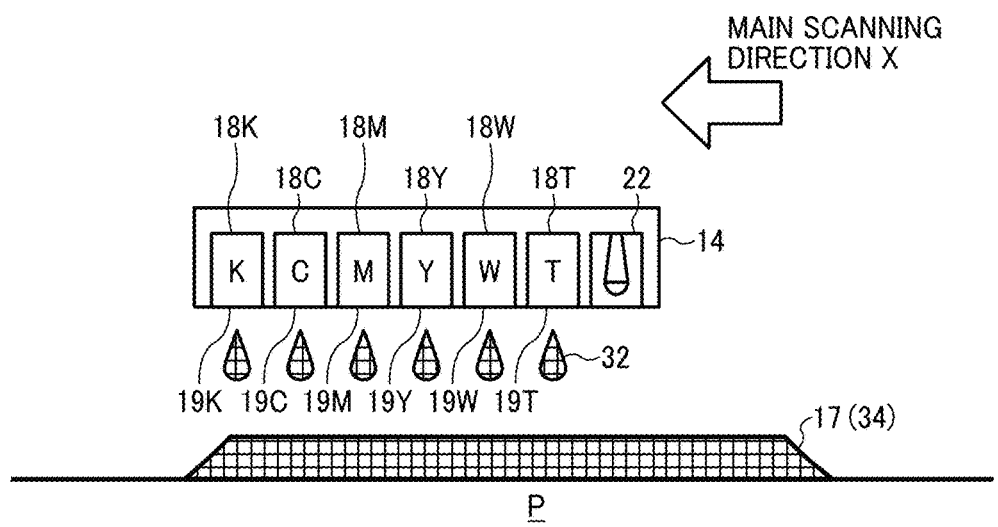
FIG. 5 is a schematic diagram illustrating another example of the recording unit of an image forming apparatus according to an embodiment of the present invention.

The number and the position of the irradiator 22 are not limited to those illustrated in FIG. 4. For example, as illustrated in FIG. 5, the irradiator may be located to a position downstream of the recording unit 14 in the main scanning direction X.

Figure 6:
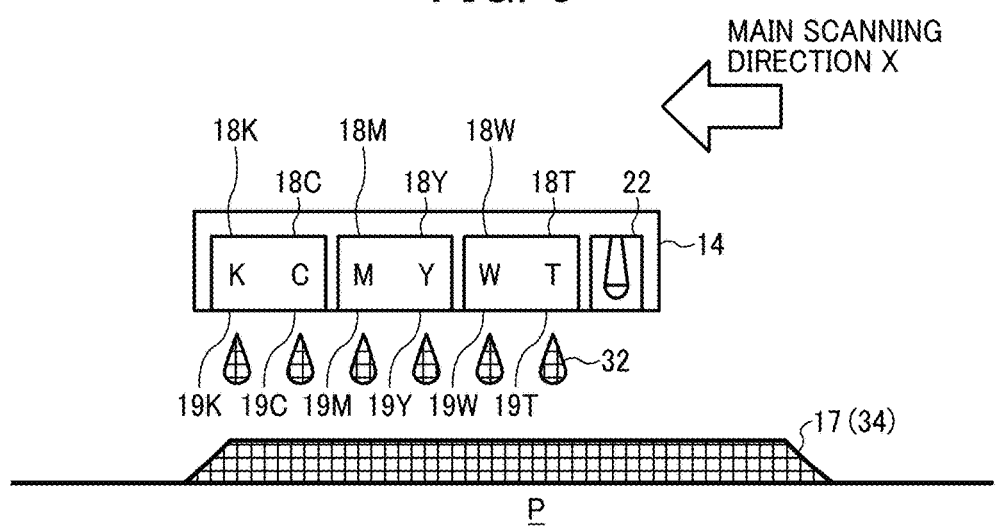
FIG. 6 is a schematic diagram illustrating another example of the recording unit of an image forming apparatus according to an embodiment of the present invention.

In FIG. 4, each of the heads 18 discharges one color (kind) of the droplets 32 but is not limited thereto. For example, as illustrated in FIG. 6, each head 18 may have two or more nozzles 19. In addition, each nozzle 19 may discharge a liquid mixture of multiple kinds of the droplets 32. In addition, the color of the ink discharged from the recording unit 14 is not limited to black, cyan, magenta, and yellow. In addition, the kind of the droplets 32 discharged from the recording unit 14 is not limited to the six kinds (black, cyan, magenta, yellow, white, and transparent).

In addition, as illustrated in FIG. 1, the additive manufacturing device 30 forms dot 34 by the droplet 32 on the support P and laminates the dot 34 by relatively moving the recording unit 14 and the support P while discharging the droplet 32 from the nozzle 19 of the recording unit 14. The support P may be planar or a solid form having rough surface.

Image Forming Method

The print method (also referred to as image forming method) by the image forming apparatus 30 is described next. The image forming apparatus 30 of this embodiment has the scanning unit 28A and is capable of forming images according to multiple scanning method. In addition, the image forming apparatus 30 has the matte lamination control unit 28C and is capable of forming images according to the matte lamination method, which is described later. In addition, it is preferable to form images according to the matte lamination method, which is described later, by a control by the normal lamination control unit 28B. Each image forming method is described below.

Multiple Scanning Method

First, the multiple scanning method is described. As the image forming method for an inkjet image forming apparatus, a multiple scanning printing (multiple path printing) method is known, which includes forming an image in one area (image forming area) on the support P by conducting main scanning multiple times using the same or different nozzle groups. Due to the main scanning multiple times for the one area on the support P, the obtained image can have a high resolution. Hereinafter, printing in the one area on the support P by the main scanning n times is referred to as n scanning printing.

Figure 7:
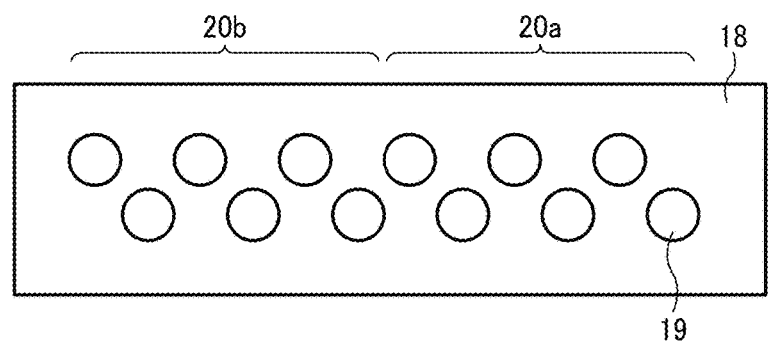
FIG. 7 is a diagram illustrating an example of nozzle distribution for 2 scanning printing.
Figure 8:
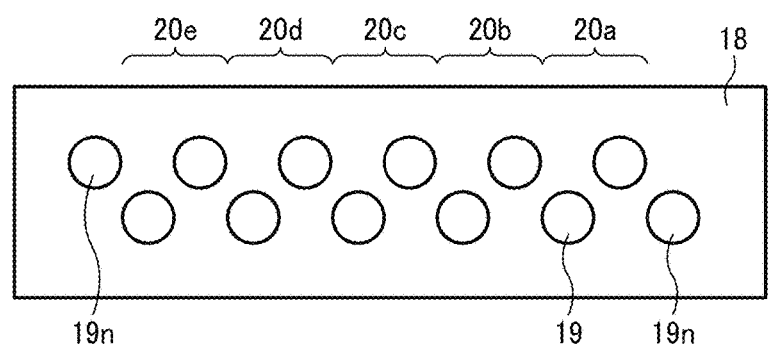
FIG. 8 is a diagram illustrating an example of nozzle distribution for 5 scanning printing.

In addition, in the multiple scanning printing, mask processing is conducted in which the nozzle 19 is equally distributed to the number of scanning. FIGS. 7 and 8 are schematic diagrams illustrating the head 18 having 12 nozzles. In general, the number of nozzles is 1,000 nozzles or more, for example, 1,280 nozzles. In this case, 12 nozzles are used for convenience for description.

Therefore, for example, as illustrated in FIG. 7, when an image is formed using the head 18 having 12 nozzles 19 by 2 scanning printing, the number of nozzles/the number of scanning is that 12 divided by 2 equals 6. That is, six nozzles are used per scanning. Therefore, for example, the mask processing is conducted to form an image using 6 nozzles 19 of a nozzle group 20a in the first scanning and 6 nozzles 19 of a nozzle group 20b in the second scanning.

Figure 9A:
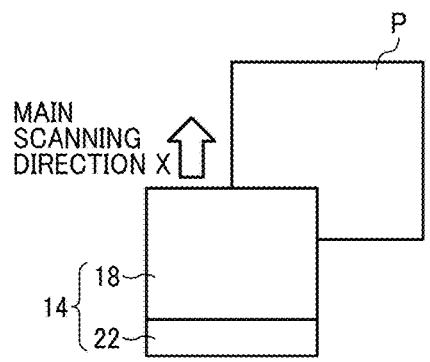
FIGS. 9A, 9B, 9C, 9D, and 9E are diagrams illustrating the processes of the image forming according to 2 scanning printing.
Figure 9B:
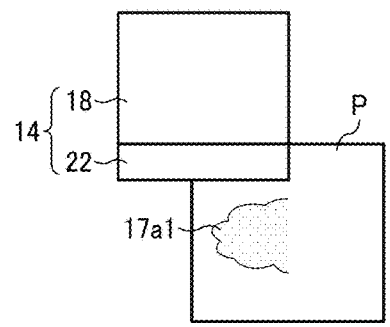

In addition, when the number of nozzles is not dividable by the number of scanning, non-use nozzles are assigned only to use the dividable number of the nozzle. The number of non-use nozzles is set to be the minimum. Therefore, for example, as illustrated in FIG. 8, when an image is formed using the head 18 having 12 nozzles 19 by 5 scanning printing, the number of nozzles/the number of scanning is that 12 divided by 5 equals 2 with a remainder of 2. That is, two nozzles are used per scanning and two nozzles are assigned as non-use nozzles 19n. For example, the image is formed by using the two nozzles 19 of the nozzle group 20a in the first scanning, the two nozzles 19 of the nozzle group 20b in the second scanning, the two nozzles 19 of the nozzle group 20c in the third scanning, the two nozzles 19 of the nozzle group 20d in the fourth scanning, and the two nozzles 19 of the nozzle group 20e in the fifth scanning, FIGS. 9A, 9B, 9C, 9D, and 9E are diagrams illustrating the recording unit 14 and the support P from above in the perpendicular direction Z to illustrate the processes of the image forming by 2 scanning printing. As illustrated in FIG. 9A, the recording unit 14 moves in the main scanning direction X relative to the support P in the first scanning. As illustrated in FIG. 9B, an image 17a1 is formed on the support P. In the image 17a1, the first scanning is complete in the image formed by the 2 scanning printing.

Figure 9C:
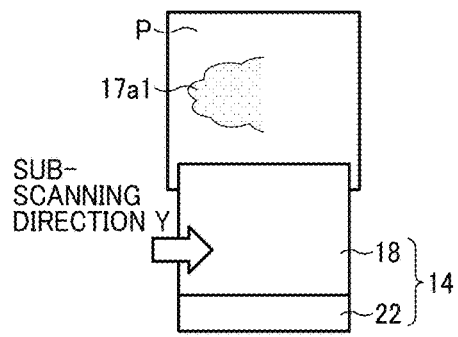
Figure 9D:
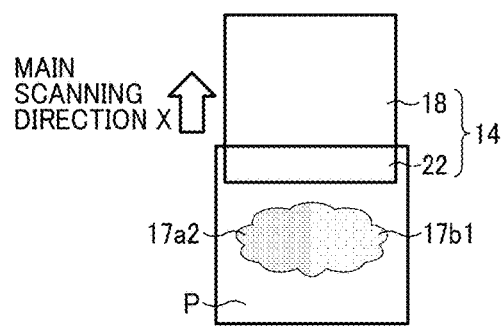

Next, as illustrated in FIG. 9C, the recording unit 14 moves back to the original position in the main scanning direction X relative to the support P and moves to the sub-scanning direction Y. Thereafter, as illustrated in FIG. 9D, an image 17a2 of the second scanning is formed in the left side and an image 17b1 of the first scanning is formed in the right side. When the image 17a2 is formed, the image on this area is completely formed. In the image 17b1, the first scanning is complete in the image formed by the 2 scanning printing. The image 17b1 is formed by the nozzle group of the first scanning that has formed the image 17a1.

Figure 9E:
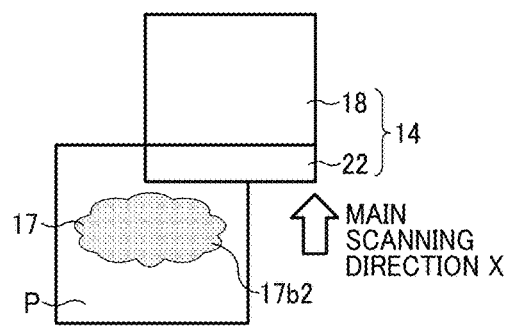

Next, as illustrated in FIG. 9E, the recording unit 14 moves back to the original position in the main scanning direction X relative to the support P and moves to the sub-scanning direction Y to form an image 17b2 of the second scanning on the right area. When the image 17b2 is formed, the image on this area is completely formed so that the image 17 is complete.

In the 2 scanning printing illustrated in FIG. 9, the image 17a1 and the image 17b1 are formed by the nozzle groups assigned to the first scanning and the image 17a2 and the image 17b2 are formed by the nozzle groups assigned to the second scanning In the example of FIG. 9, multiple scanning printing is illustrated in which the image formed in the first scanning is superimposed with the image formed in the second scanning. However, it is to be noted that the multiple scanning printing and the normal lamination method and the matte lamination method, which are described below, include a case in which the image 17 is formed in different small areas segmentalized in one area by the dots 34 landing on the different segmentalized small areas by each scanning.

Normal Lamination Method

It is preferable that the image forming apparatus 30 relating to the embodiment has the normal lamination control unit 28B and is capable of forming images according to the normal lamination method. The normal lamination method forms an image by repeating the multiple scanning printing described above for a preset number of layers (for example three layers).

The normal lamination method to form each layer by 16 scanning printing is described with reference to FIG. 10.

Figure 10A:
FIGS. 10A, 10B, 10C, and 10D are diagrams illustrating the processes of the image forming according to normal lamination method.

FIG. 10A is a schematic diagram illustrating the head 18 to which mask processing is set for the first to 16th scanning for 16 scanning printing. An image is formed by using the nozzle group 20a for the first scanning, the nozzle group 20b for the second scanning and sequentially until the nozzle group 20p for the 16th scanning.

Figure 10B:
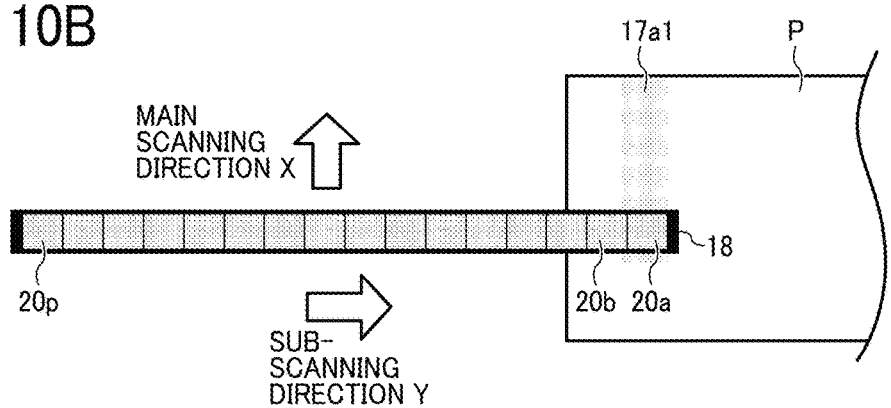

In the normal lamination method, as illustrated in FIG. 10B, the image 17a1 is formed using the nozzle group 20a in the first scanning. Next, as illustrated in FIG. 10C, the head 18 is moved in the sub-scanning direction Y (hereinafter referred to as carriage return), the image 17a2 is formed using the nozzle group 20b in the second scanning and simultaneously the image 17b1 (first scanning) is formed.

Figure 10C:
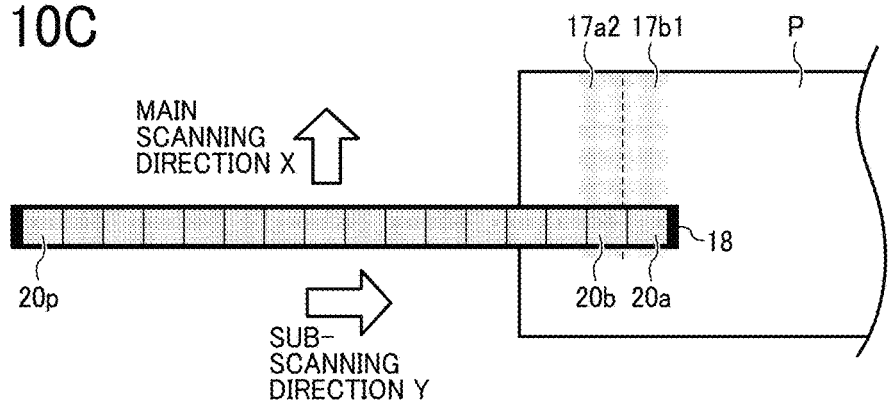
Figure 10D:
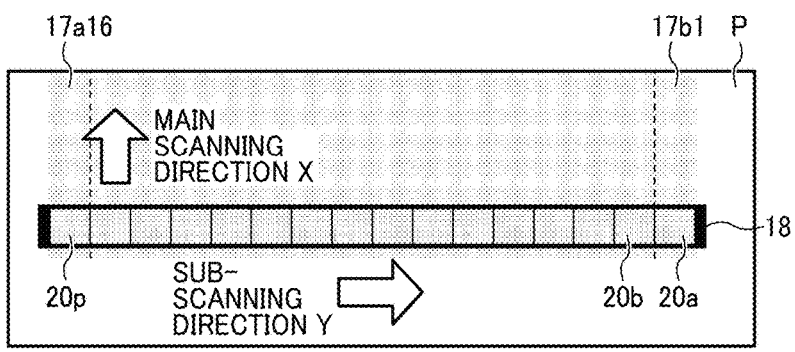

At the time of 16th scanning, as illustrated in FIG. 10D, an image 17a16 is formed using the nozzle group 20p, the image forming in this area is complete. At this point in time, an image 17p1 (first scanning) is formed and the image is complete when the 16th scanning is finished in this area.

A single layer of the image is formed by the series of behaviors illustrated in FIGS. 10B to 10D. That is, when a three-layer printing is conducted in the normal lamination method, the head returns to the state illustrated in FIG. 10B after forming the first layer image and a second layer image is thereafter formed on the first layer image.

That is, the image forming behavior of the normal lamination method can be represented by (first scanning, carriage return, second scanning, carriage return, sequentially up to 16th scanning)×number of layers.

Figure 11:
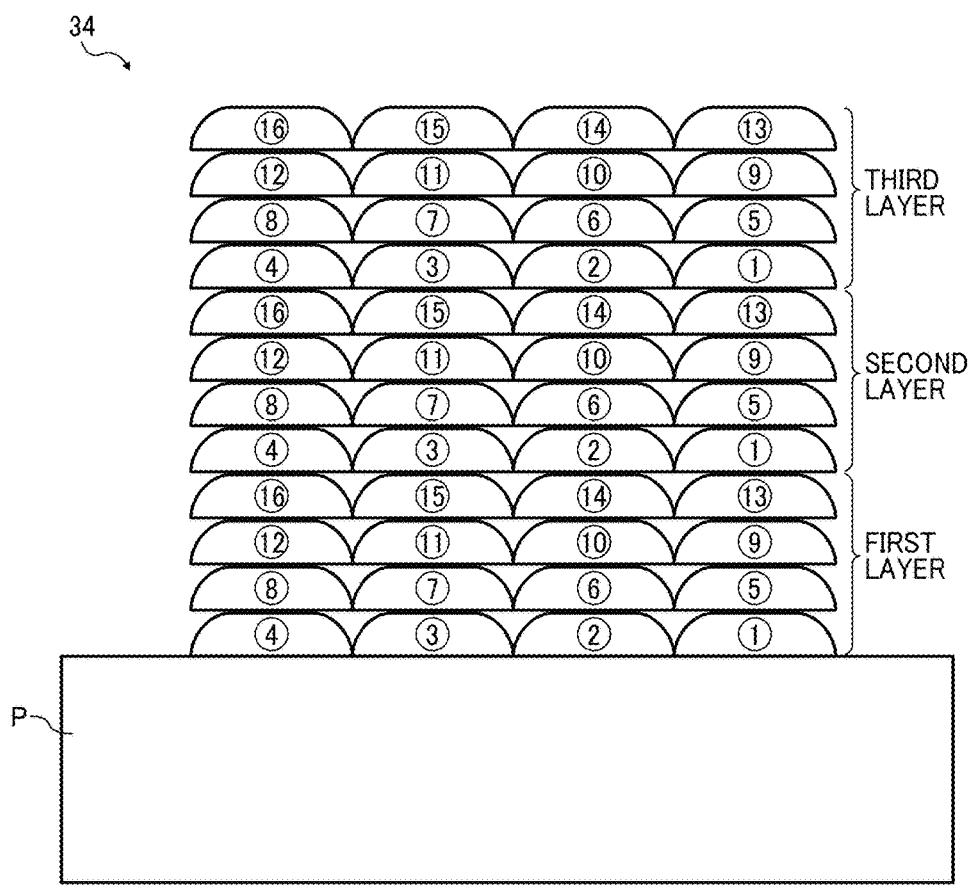
FIG. 11 is a diagram illustrating the landing of the dots formed in the first to 16th scanning in a three-layer printing by the normal lamination method.

FIG. 11 is a diagram illustrating the lamination of the dot 34 by the droplet 32 discharged in the first to 16th scanning in a three-layer printing by the normal lamination method.

Figure 12:
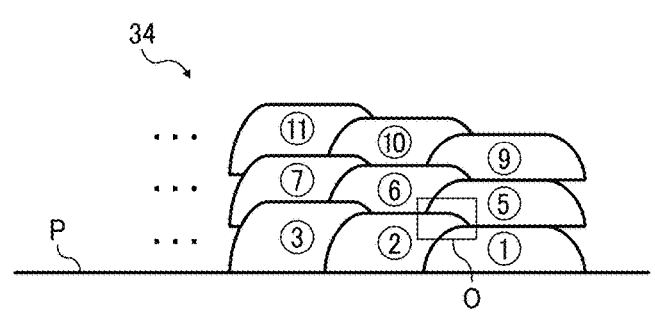
FIG. 12 is an enlarged diagram illustrating the process of lamination of dots in the normal lamination method.

As illustrated in FIG. 11, in the normal lamination method, the dots 34 land according to the circled numbers 1 to 16 to form a first layer. Thereafter, the dots 34 of the circled numbers 1 to 16 in FIG. 11 land on to form a second layer. Thereafter, the dots 34 of the circled numbers 1 to 16 in FIG. 11 land on to form a third layer FIG. 12 is an enlarged diagram illustrating an example of the process of lamination of dots 34 according to the normal lamination method. The image forming apparatus 30 normally prints with dots having a larger diameter than the distance between the adjacent dots. For this reason, in the case of the normal lamination method, as illustrated in FIG. 12, for example, the dots 34 in the second scanning and the dots 34 formed in the first scanning form overlapped portions O.

This normal lamination method is known to make it possible to form an image having excellent gloss uniformity by controlling the amounts of color inks and clear ink. However, it is not possible to subdue the gloss. This is because it is impossible to roughen the surface of an image as illustrated in FIGS. 11 and 12.

Matte Lamination Method

The matte lamination control unit 28C causes the image forming apparatus 30 relating to the embodiment to form images according to the matte lamination method.

The matte lamination method to form each layer by 16 scanning printing is described with reference to FIG. 13. In this case, a three-layer printing is described. Unlike the normal lamination method, layers are not sequentially formed like a first layer, second layer, etc. in the matte lamination method. However, the concept of the number of layers in the normal lamination method is used for convenience for description.

Figure 13A:
FIGS. 13A, 13B, 13C, 13D, and 13E are diagrams illustrating the processes according to the matte lamination method.

FIG. 13A is a schematic diagram illustrating the head 18 to which mask processing is set for the first to 16th scanning for 16 scanning printing. An image is formed by using the nozzle group 20a for the first scanning, the nozzle group 20b for the second scanning, and sequentially up to the nozzle group 20p for the 16th scanning in the same manner as that illustrated in FIG. 10A.

Figure 13B:
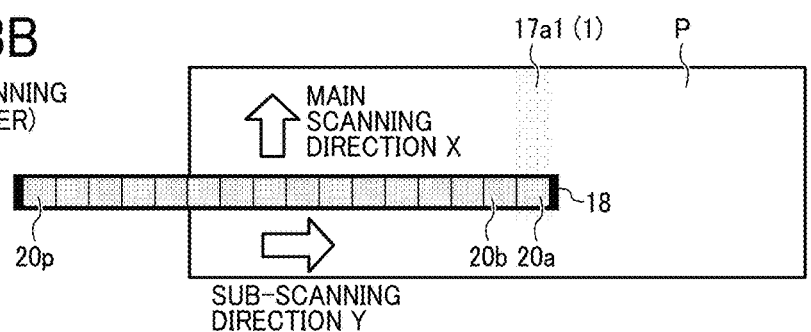

In the matte lamination method, as illustrated in FIG. 13B, the image 17a1(1) is formed using the nozzle group 20a in the first scanning. (n) represents an image of nth layer.

Figure 13C:
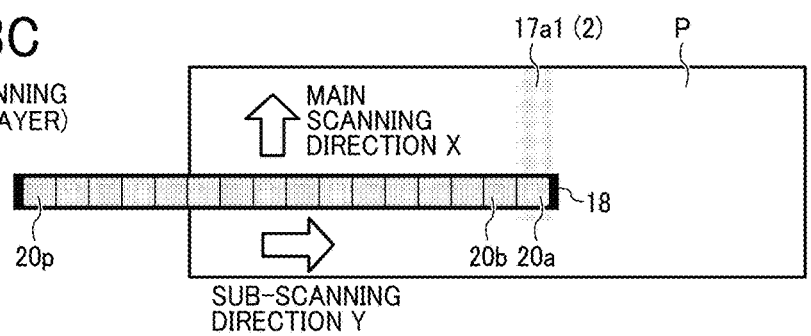

Thereafter, as illustrated in FIG. 13C, the second main scanning is conducted with no carriage return to form an image 17a1(2) by the nozzle group 20a.

Figure 13D:
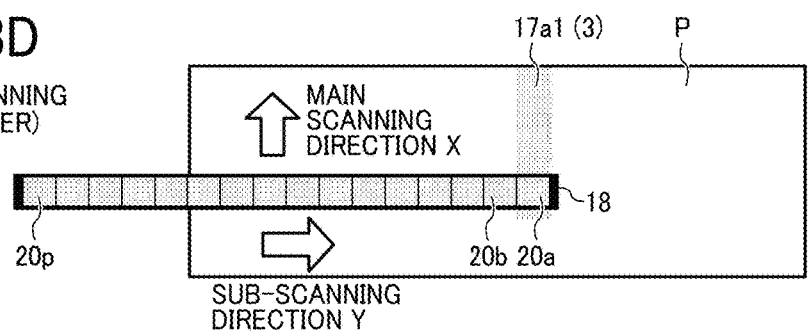

Thereafter, as illustrated in FIG. 13D, the third main scanning is conducted with no carriage return to form an image 17a1(3) by the nozzle group 20a.

Figure 13E:
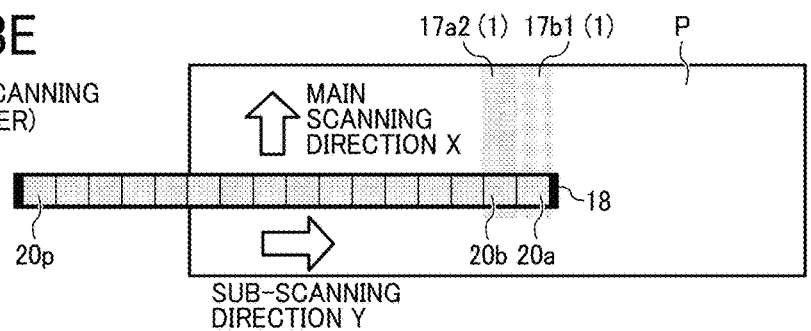

Thereafter, as illustrated in FIG. 13E, after a carriage return, an image 17a2(1) is formed using the nozzle group 20b in the second scanning. At this point in time, an image 17b1(1) is formed by the nozzle group 20a in the area where the image 17a1(1) to (3) are formed. This repeats until the 16th scanning to complete an image.

That is, the image forming behavior of the matte lamination method can be represented by (first scanning×number of layers, second scanning×number of layers, sequentially up to 16th scanning×number of layers). In the matte lamination method, an image is not formed layer by layer but an image corresponding to an amount of multiple layers is formed in a 3D manner at once. In the case of a single layer, the image forming sequence in both methods is identical so that the matte lamination method is applied to a case in which the number of layer is two or more.

Figure 14:
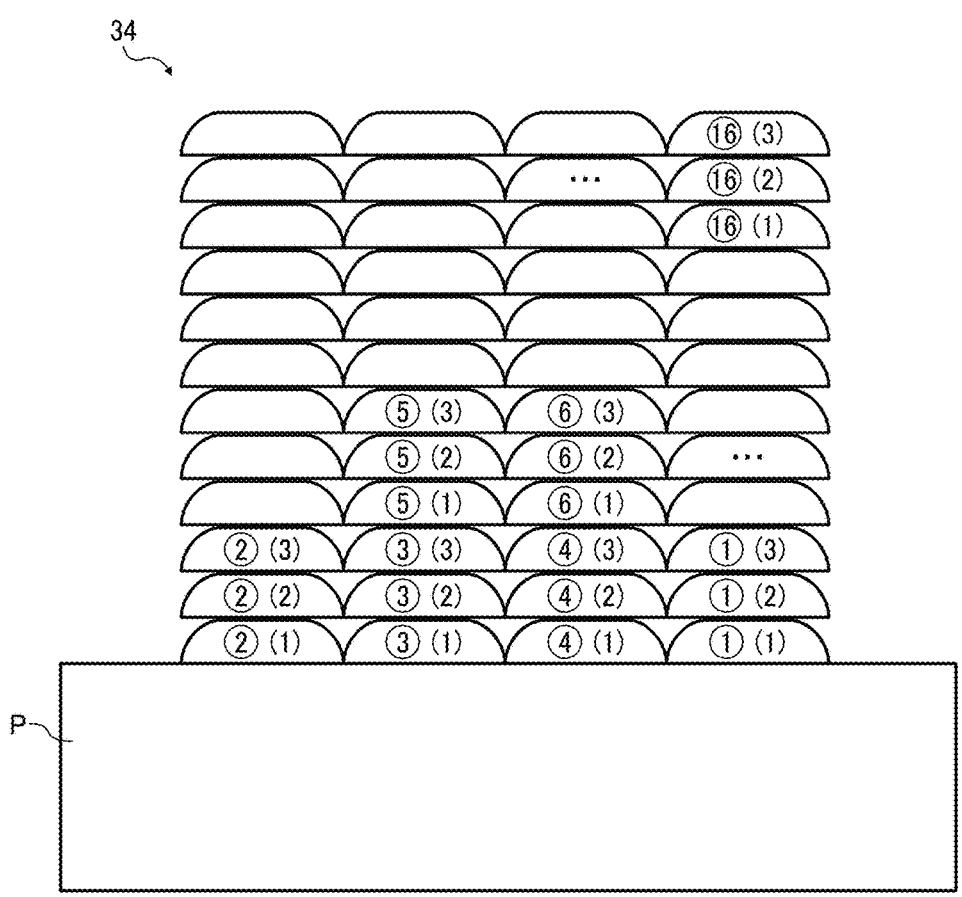
FIG. 14 is a diagram illustrating the landing of the dot formed in the first to 16th scanning in a three-layer printing by the matte lamination method.

FIG. 14 is a diagram illustrating the lamination of the dots 34 by the droplets 32 discharged in the first to 16th scanning in a three-layer printing by the matte lamination method.

As illustrated in FIG. 14, in the matte lamination method, the dots 34 {(1) to (3) of circled number 1} of each layer (1) to (3) are formed for the first scanning, the dots 34 {(1) to (3) of circled number 2} of each layer (1) to (3) are formed for the second scanning, the dots 34 {(1) to (3) of circled number 3} of each layer (1) to (3) are formed for the third scanning until the dots 34 {(1) to (3) of circled number 16} of each layer (1) to (3) are formed for the 16th scanning.

In addition, FIGS. 15A, 15B, 15C, and 15D are enlarged diagrams illustrating an example of the process of lamination of dots 34 according to the matte lamination method. As described above, the image forming apparatus 30 normally prints with dots having a larger diameter than the distance between the adjacent dots.

Figure 15A:
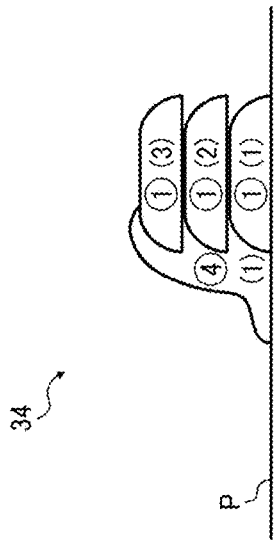
FIGS. 15A, 15B, 15C, and 15D are enlarged diagrams illustrating the process of lamination of dots according to the matte lamination method.
Figure 15B:
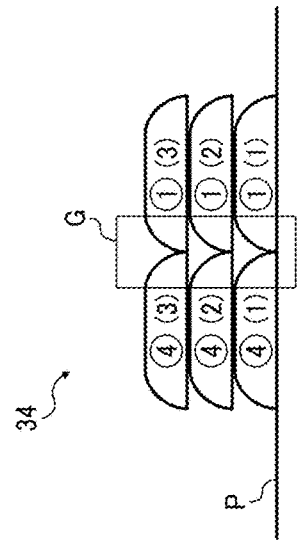
Figure 15C:
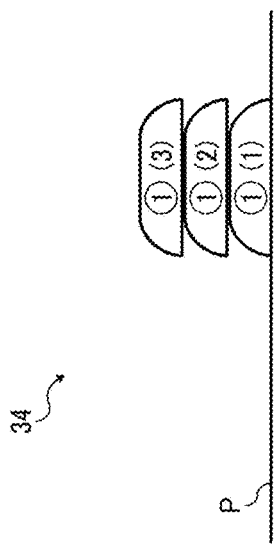
Figure 15D:
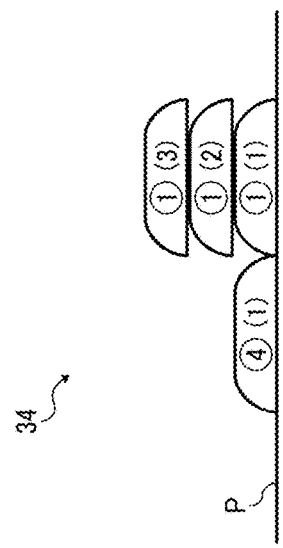

In this case, as illustrated in FIG. 15A, the dots 34 {(1) to (3) of circled number 1} of each layer (1) to (3) are formed for the first scanning, thereafter, as illustrated in FIGS. 15B and 15C, when the layers (1) to (3) for the fourth scanning are printed at the adjacent position of the laminated dots 34, the ink drops down due the gravity. Therefore, as illustrated in FIG. 15D, the ink does not overlap on the laminated dots 34, thereby deepening a groove G between the adjacent dots. This matte lamination method causes the rate of the portion of the groove G, which diffuses and reflects light. As a result, an image can be formed with a subdued gloss.

Gloss According to Image Forming Method

The image forming apparatus 30 is capable of forming an image according to both an image forming method utilizing the matte lamination method and an image forming method utilizing the normal lamination method. It is preferable to form an image by choosing the normal lamination method or the matte lamination method depending on the gloss a user desires. For example, the matte lamination method is selected in a low gloss mode in which gloss is uniformed at or below a threshold gloss value, and the normal lamination method is selected in the other modes.

Figure 16:
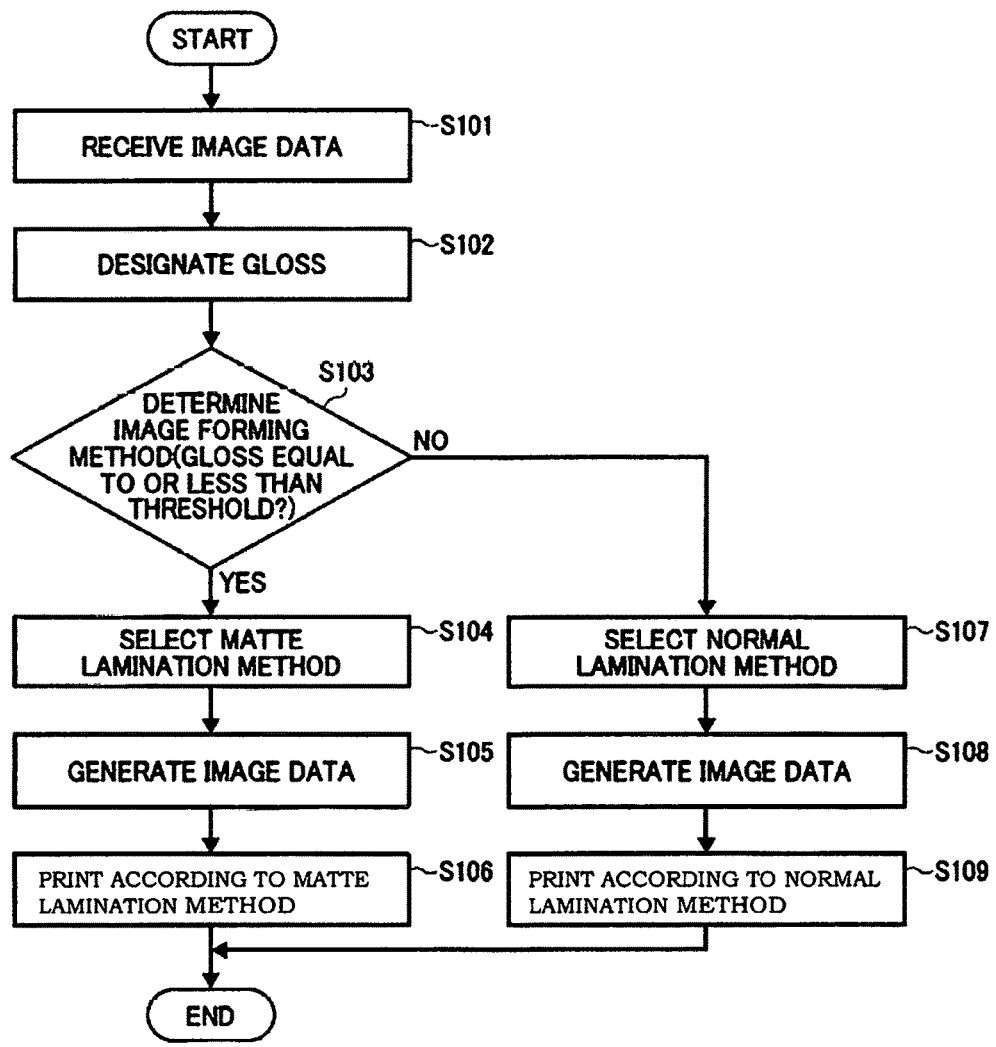
FIG. 16 is a flow chart illustrating an example of the selection processing of the image forming methods.

FIG. 16 is a flow chart illustrating an example of the selection processing of the image forming method. First, the data receiver 12A of the main control unit 13 receives image data (S101). Next, a user designates the gloss for an image formed based on the image data received at the data receiver 12A (S102). The selection processing of the gloss is not particularly limited. For example, the selection screen is displayed on the display 131 of the image processing device 12 from which a user can select the gloss and the input by the user on the input unit 130 is received. In addition, the designation processing (S102) of the gloss can be conducted in such a manner that the gloss data are added to the image data before the data receiver 12A receives the image data and thereafter the image data having the gloss information is sent to the data receiver 12A.

Next, the determining unit 12D determines whether the image forming method is the matte lamination method or the normal lamination method based on the gloss selected at the designation process (S102) of the gloss and the preset threshold (S103).

The determining unit 12D selects printing according to the matte lamination method (S104) when the selected gloss is the threshold or less (Yes to S103). The determining unit 12D selects printing according to the normal lamination method (S107) when the selected gloss is above the threshold (No to S103).

Next, the data generating unit 12B executes image processing of the image data based on the selected image forming method (S105 and S108). In the case of the matte lamination method, the data generating unit 12B sorts the image data to discharge the droplet 32 through the nozzle 19 in the discharging sequence of the matte lamination method described above. In the case of the normal lamination method, the data generating unit 12B generates the image data to discharge the droplet 32 through the nozzle 19 in the discharging sequence of the normal lamination method described above.

The data output unit 12C outputs the image data processed at the data generating unit 12B to the image forming apparatus 30. In addition, the record control unit 28 controls the recording unit 14, the drive unit 25, and the irradiator 22 of the image forming apparatus 30 according to the selected method (S106 and S109).

Figure 17:
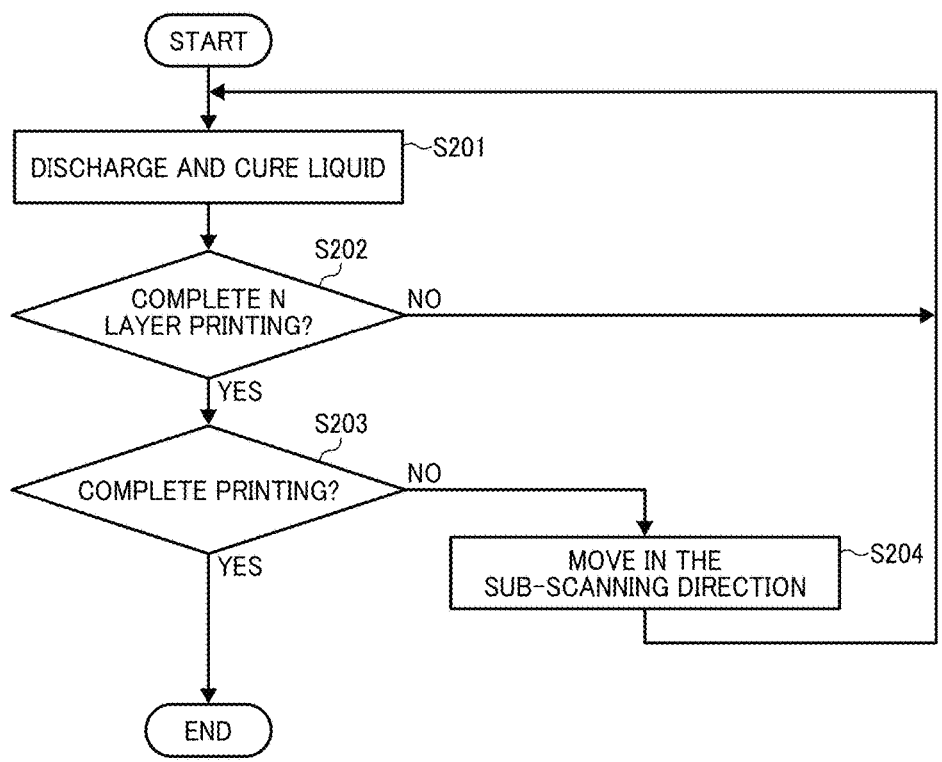
FIG. 17 is a flow chart illustrating the detail of print processing according to the matte lamination method.

FIG. 17 is a flow chart illustrating the detail of print processing (S106 of FIG. 16) according to the matte lamination method.

The matte lamination control unit 28C causes the recording unit 14 to discharge the droplet 32 at a preset position and the irradiator 22 to irradiate the discharged droplet 32 (dot 34) with light to cure the droplet 32 (S201).

The matte lamination control unit 28C checks whether the n layers are laminated at the preset position (S202) after the dot 34 is cured. If the n layers are not laminated (No to S202), the process returns to S201. If the n layers are laminated (Yes to S202), the matte lamination control unit 208C determined whether the print is complete (S203).

When there are no image data for printing (Yes to S203), the matte lamination control unit 28C completes the printing. When there are image data for printing (No to S203), the matte lamination control unit 28C causes the recording unit 14 or the operating stage 16 to relatively move in the sub-scanning direction (S204). After moving in the sub-scanning direction, the process returns to S201 and the recording unit 14 starts printing again.

Figure 18:
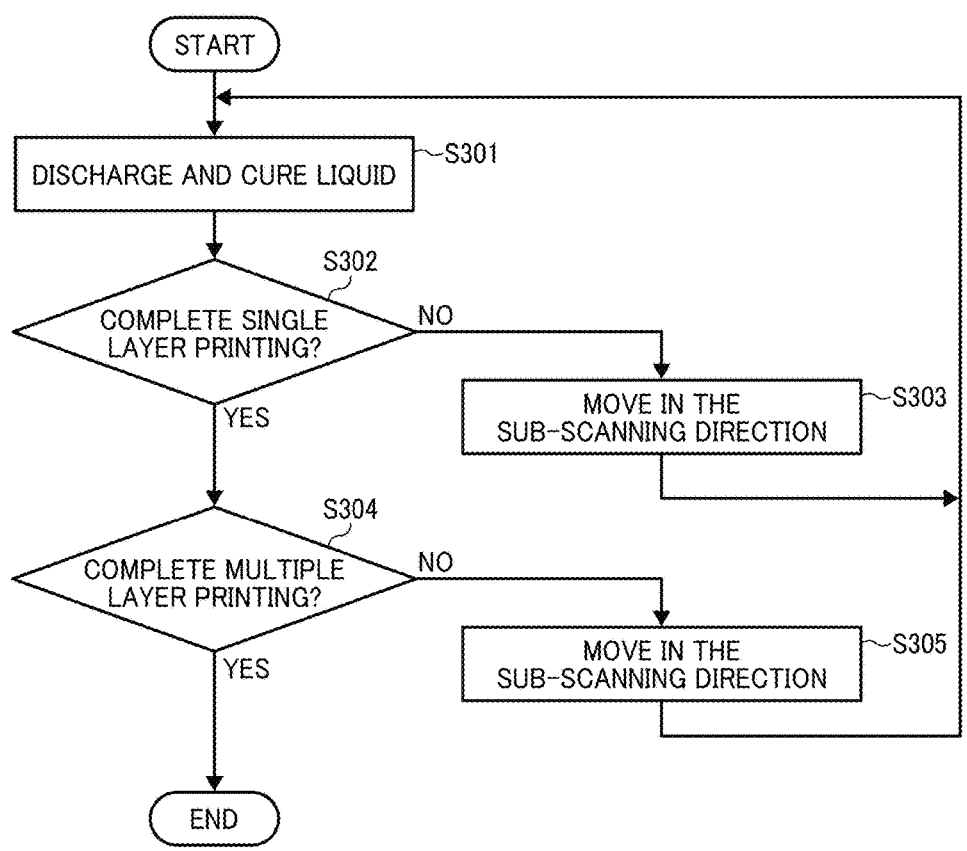
FIG. 18 is a flow chart illustrating the detail of print processing according to the normal lamination method.

FIG. 18 is a flow chart illustrating the detail of print processing (S106 of FIG. 16) according to the normal lamination method.

The normal lamination control unit 28B causes the recording unit 14 to discharge the droplet 32 at a preset position and the irradiator 22 to irradiate the discharged droplet 32 (dot 34) with light to cure the droplet 32 (S301).

The normal lamination control unit 28B checks whether the first layer image is formed (S302) after the dot 34 is cured. When the first layer image is not formed (No to S302), the normal lamination control unit 28B causes the recording unit 14 or the operating stage 16 to relatively move in the sub-scanning direction (S303). After moving the recording unit 14 or the operating stage 16 relatively in the sub-scanning direction, the process returns to S301.

If the first layer image is complete (Yes to S302), the normal lamination lamination control unit 28B determines whether multiple layers are printed (S304). If the multiple layers are printed (Yes to S304), the normal lamination printing is complete.

When the multiple layers are not complete (No to S304), the normal lamination control unit 28B causes the recording unit 14 or the operating stage 16 to relatively move in the sub-scanning direction (S305). At this point, the normal lamination control unit 28B moves the recording unit 14 or the operating stage 16 back to the image forming starting position. After moving the recording unit 14 or the operating stage 16, the process returns to S301.

Figure 19:
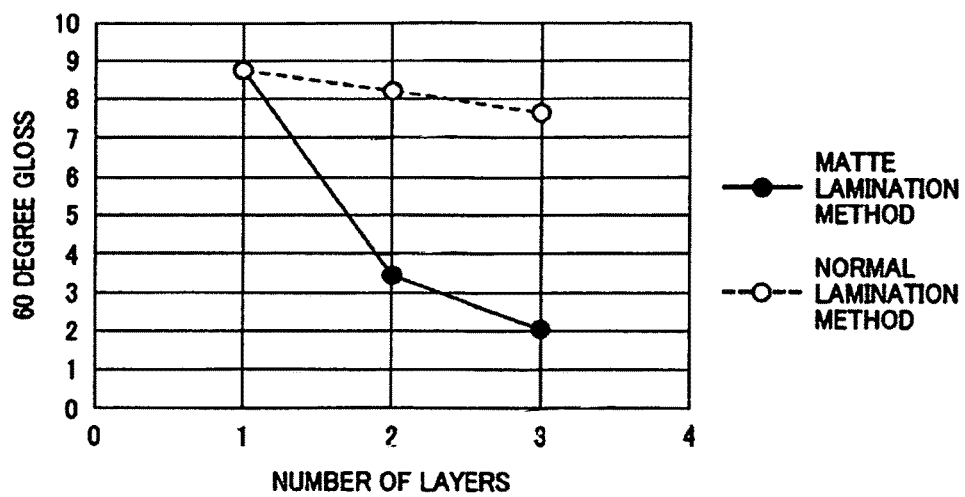
FIG. 19 is a graph illustrating a relation between the number of layers and 60 degree gloss for each lamination method.

FIG. 19 is a graph illustrating a relation between the number of layers and 60 degree gloss for each lamination method. As described later, in the case of forming a single layer, the image forming sequence in both methods is identical so that the values are the same as shown in the graph.

As seen in the graph illustrated in FIG. 19, when the number of the layers is two or more, the 60 degree gloss is kept low by the matte lamination method. In the measuring examples in FIG. 19, while the value is not below 8 for the two layers or 7 for the three layers in the normal lamination method, it is 4 or less for the two layers or 3 for the three layers in the matte lamination method.

Figure 20:
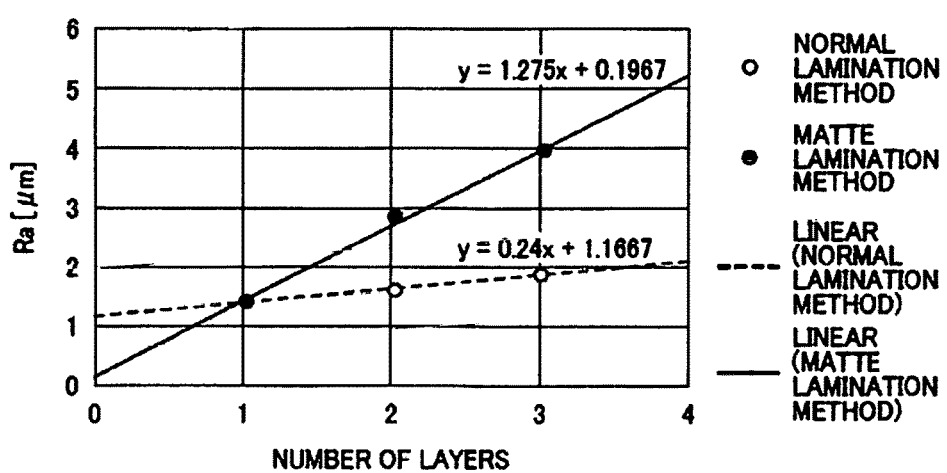
FIG. 20 is a graph illustrating a relation between the number of layers and arithmetic average roughness Ra for each lamination method.

In addition, FIG. 20 is a graph illustrating a relation between the number of layers and arithmetic average roughness Ra for each lamination method. In the case of forming a single layer, the values are the same as described above.

As seen in the graph illustrated in FIG. 20, when the number of the layers is two or more, the arithmetic average roughness Ra increases in the matte lamination method as the number of layers increases. Since there is a trade-off between the arithmetic average roughness Ra and the gloss, it is possible to keep the gloss low in the matte lamination method as seen in the graph of FIG. 20.

The image formed according to the matte lamination method has a roughened surface by deepening the groove between the adjacent dots in comparison with the image formed according to the normal lamination method. For this reason, an image having a low gloss level can be formed.

In addition, when an image is formed having multiple (at least three) layers, an image can be formed for several top layers of the multiple layers by the matte and for the rest by the normal, that is, the surface portion is roughened to obtain an image having a lower gloss level.

In the description above, to rearrange the sequence of the dot discharging, the image data are sorted. However, in the case of a solid image, images can be formed according to the matte lamination method without sorting the image data.

Gloss Uniformity Control

Next, below is a description about image forming by a combination of the normal lamination method and the matte lamination method to meet the gloss level a user desires.

The image processing device 12 relating to the embodiment preferably has the patch forming unit 28D.

The patch forming unit 28D prints a test chart having multiple patches formed by changing the number of layers and the combination of the normal lamination method and the matte lamination method.

Figure 21:
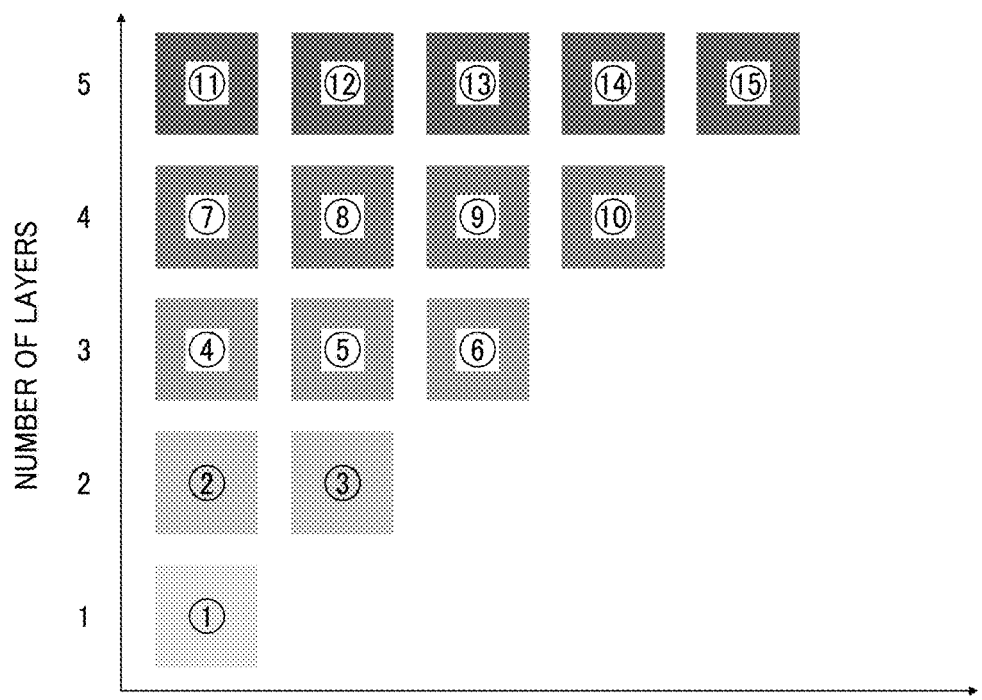
FIG. 21 is a test chart having multiple patches formed by changing the number of layers and the combination of the normal lamination method and the matte lamination method.
Figure 22:
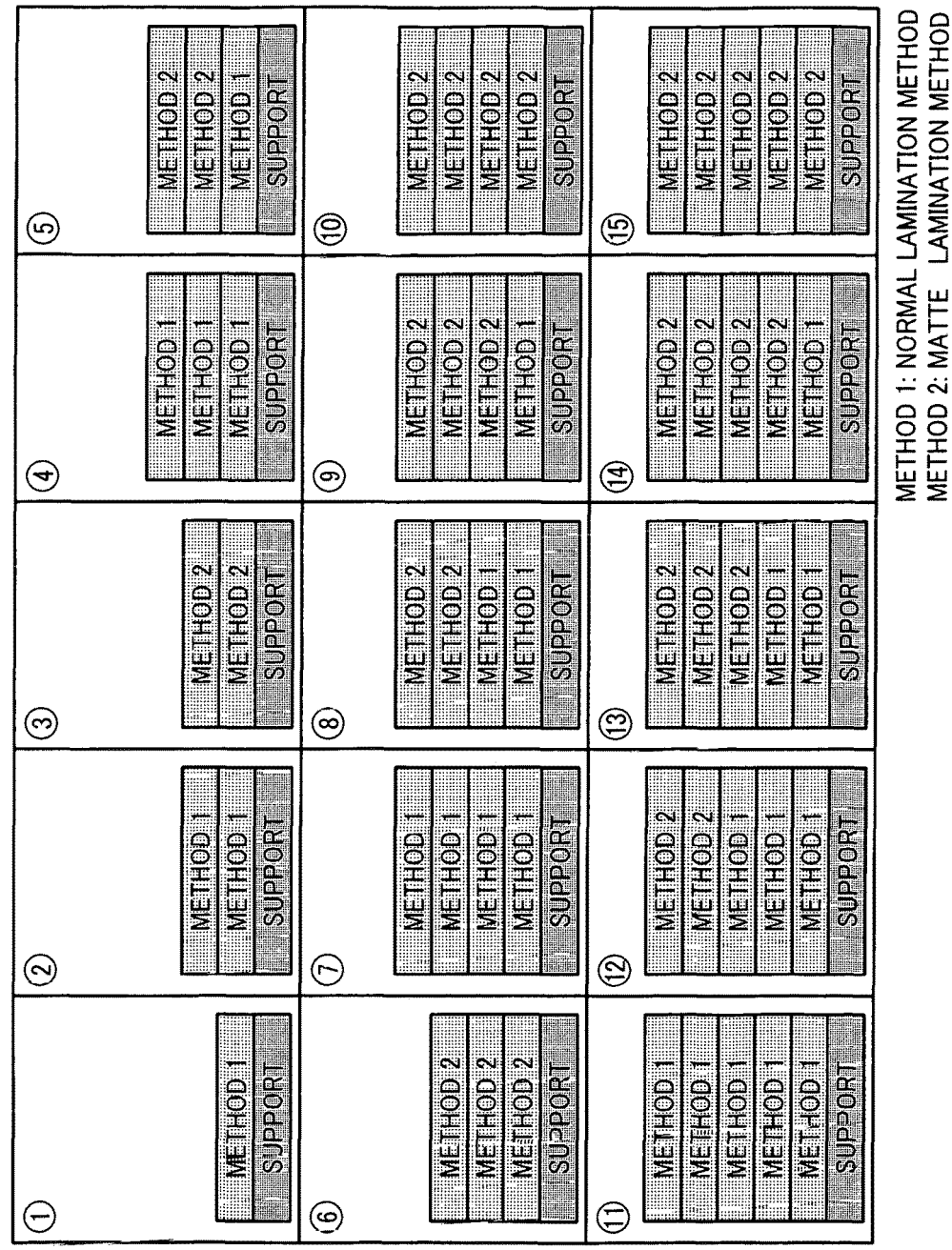
FIG. 22 is a diagram illustrating the combination of the normal lamination method and the matte lamination method about each patch illustrated in FIG. 21.

FIG. 21 is a test chart of the lamination method. FIG. 22 is a diagram illustrating the image forming by the combination of the matte lamination method and the normal lamination method for each patch of circled numbers of from 1 to 15 illustrated in FIG. 21.

The test chart illustrated in FIG. 21 includes patches forming 1 to 5 layers using only black ink droplets. Each layer is formed by the combination of the image forming methods illustrated in FIG. 22. In FIG. 21, the density seems different but since each patch is a solid image using only black ink droplets, these actually have different number of layers and gloss levels with the same gradation value.

The gloss is measured for each patch illustrated in FIG. 21, thereby making it possible to select a combination of the image forming methods according to the gloss a user desires.

By forming the test chart illustrated in FIG. 21 for the color of ink, the gloss of an image having multiple layers formed according to the combination of the image lamination methods is measured for each ink color, so that the relation between the number of layers and the gloss can be obtained. Therefore, it is possible to form an image by selecting an optimal combination of the number of layers and the image forming methods to meet the gloss a user desires.

Figure 23:
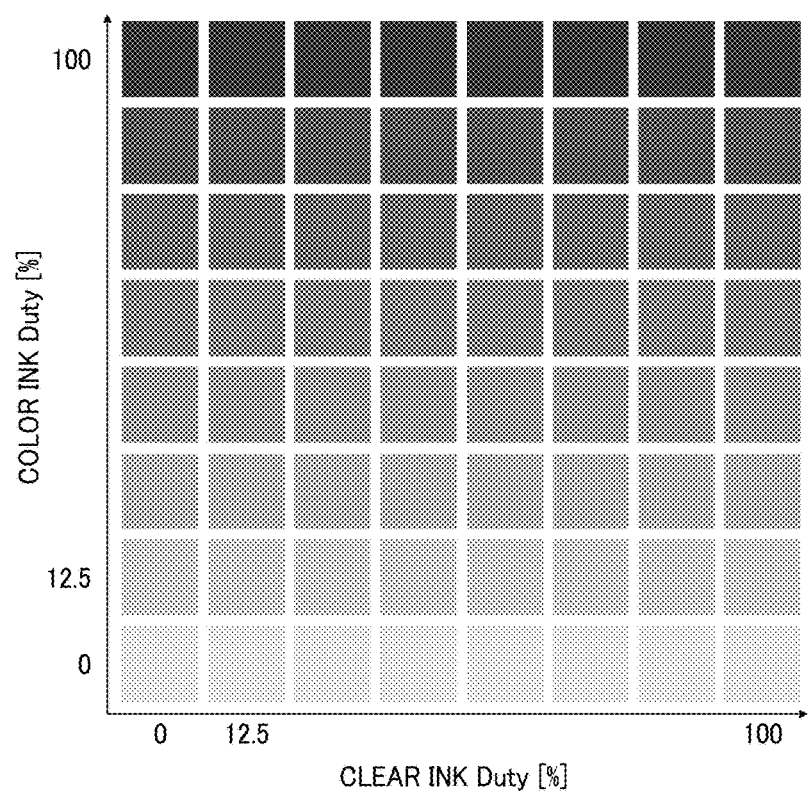
FIG. 23 is a gray scale chart about black ink droplets.

FIG. 23 is a gray scale chart about black ink droplets. The patch forming unit 28D prints a gray scale chart including multiple patches formed by changing the amount of color ink (color duty) and the amount of cleat ink (clear duty) discharged per unit of area. Black ink droplets and clear ink droplets are used in the example here. The criterion to determine the color duty and the clear duty is the amount of each ink per unit of area in the multiple layer.

Using the preset number of layers and the combination of the lamination methods selected from the test chart illustrated in FIG. 21, the gray scale chart illustrated in FIG. 23 is output. Using each patch of this gray scale chart, the gloss of each patch is measured, thereby making it possible to select a combination of the color duty and the clear duty to meet the gloss a user desires.

Figure 24:
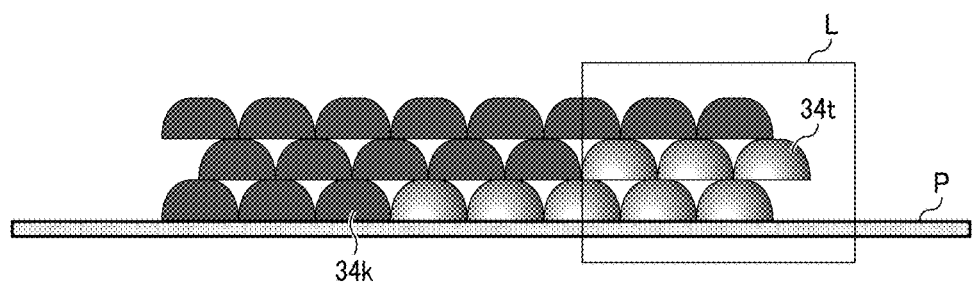
FIG. 24 is a schematic diagram illustrating a three-layer printing using clear ink.

FIG. 24 is a schematic diagram illustrating a three-layer printing using clear ink. The dot 34k represents the dot of a black ink droplet and the dot 34t represents the dot of clear ink droplet. As illustrated in FIG. 24, the uppermost layer is formed with color ink and the layers under the uppermost layer are laminated with ink including clear ink. For example, a low density area illustrated as L in FIG. 24 can be formed so that a uniform surface form is obtained irrespective of the image density.

As described above, by discharging a preset amount of the clear ink together with the color ink for an area (portion) of an image, the gloss of the whole image can be adjusted to obtain a high uniformity with regard to the gloss.

According to the image forming apparatus relating to the embodiments described above, it is possible to keep the gloss of a formed image to or lower than a particular low value (for example, 7 for 60 degrees gloss) by selecting a print method (matte lamination method) to roughen the print surface by dot lamination in an image forming apparatus that forms the image on an object such as a recording medium by discharging an ink curable upon application of light and curing the ink with irradiation of light.

In addition, an image having excellent gloss uniformity can be formed by adjusting the duty of color ink and clear ink while subduing the gloss at the particular low value or lower.

The embodiments described above are just preferred embodiments and the present invention is not limited thereto. Various modifications can be made without departing from the scope of the present invention.

According to the present disclosure, the gloss of a laminate image can be subdued Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image processing device configured to cause an image forming apparatus to form a laminate image, the image forming apparatus including a recording unit, a curing unit and a drive unit, the recording unit being configured to discharge a liquid to a recording medium, the curing unit being configured to cure the liquid discharged by the recording unit upon application of a stimulus, the drive unit being configured to move the recording unit and the curing unit, the image processing device comprising:
a memory storing computer-readable instructions; and
at least one processor operably coupled to the memory and configured to execute the computer-readable instructions to perform a matte lamination operation according to a first determined number of layers, the first determined number of layers being two or more, the matte lamination operation including,
performing a scan by,
controlling the drive unit to first move the recording unit and the curing unit in a main scanning direction,
controlling the recording unit to discharge the liquid while the drive unit first moves, and
controlling the curing unit to apply the stimulus while the drive unit first moves, and
repeating the performing the scan a number of times equal to one less than the first determined number of layers before controlling the drive unit to second move the recording unit and the curing unit in a sub-scanning direction perpendicular to the main scanning direction.

2. The image processing device according to claim 1, wherein the at least one processor is further configured to execute the computer-readable instructions to:
perform a normal lamination operation according to a second determined number of layers, the normal lamination operation being performed before the matte lamination operation, the normal lamination operation including,
forming a layer by,
performing the scan at a first position in the sub-scanning direction,
controlling the drive unit to second move the recording unit and the curing unit in the sub-scanning direction from the first position to a second position,
performing the scan at the second position, and
controlling the drive unit to third move the recording unit and the curing unit in a direction opposite to the sub-scanning direction to the first position, and
repeating the forming the layer a number of times equal to one less than the second determined number of layers.

3. The image processing device according to claim 2, wherein the at least one processor is further configured to execute the computer-readable instructions to:
compare a desired gloss level to one or more threshold gloss values; and
set the first determined number of layers and the second determined number of layers based on the comparison.

4. The image processing device according to claim 2, wherein the liquid discharged during matte lamination operation is discharged on top of the liquid discharged during the normal lamination operation.

5. The image processing device according to claim 2, wherein the at least one processor is further configured to execute the computer-readable instructions to generate a plurality of patches for each of a plurality of colors of the liquid by varying one or more of the following parameters for each patch of the plurality of patches,
the first determined number of layers, and
the second determined number of layers.

6. The image processing device according to claim 5, wherein,
the liquid contains clear ink, and
the at least one processor is further configured to execute the computer-readable instructions to generate the plurality of patches by varying one or more of the following parameters for each patch of the plurality of patches,
a color duty representing an amount of color ink discharged per unit of area, and
a clear duty representing an amount of clear ink discharged per unit of area.

7. The image processing device according to claim 2, wherein the first determined number of layers is three and the second determined number of layers is three.

8. The image processing device according to claim 2, wherein;
the recording unit includes a plurality of nozzles, and
the at least one processor is further configured to determine a value obtained by dividing a quantity of the plurality of by one or both of the first determined number of layers and the second determined number of layers, the value represents a number nozzles of the plurality of nozzles for use in the performing the scan.

9. The image processing device according to claim 8, wherein the al least one processor is further configured to determines a value corresponding to a remainder of the dividing as a number of non-use nozzles.

10. An image forming system comprising:
a recording unit configured to discharge a liquid to a recording medium, the recording unit including a plurality of nozzles;
a curing unit configured to cure the liquid discharged by the recording unit upon application of a stimulus;
a drive unit configured to move the recording unit and the curing unit; and
an image processing device configured to control the recording unit, the curing unit, and the drive unit, the image processing device including,
a memory storing computer-readable instructions; and
at least one processor operably coupled to the memory and configured to execute the computer-readable instructions to perform a matte lamination operation according to a determined number of layers, the determined number of layers being two or more, the matte lamination operation including,
performing a scan by,
controlling the drive unit to first move the recording unit and the curing unit in a main scanning direction,
controlling the recording unit to discharge the liquid while the drive unit first moves, and
controlling the curing unit to apply the stimulus while the drive unit first moves, and
repeating the performing the scan a number of times equal to one less than the determined number of layers before controlling the drive unit to second move the recording unit and the curing unit in a sub-scanning direction perpendicular to the main scanning direction.

11. A method performed by an image processing device to control an image forming apparatus to form a laminate image, the image processing device including a memory storing computer-readable instructions, and at least one processor operably coupled to the memory and configured to execute the computer-readable instructions, the image forming apparatus including a recording unit, a curing unit and a drive unit, the recording unit being configured to discharge a liquid to a recording medium, the curing unit being configured to cure the liquid discharged by the recording unit upon application of a stimulus, the drive unit being configured to move the recording unit and the curing unit, the method comprising:

performing a matte lamination operation according to a determined number of layers, the determined number of layers being two or more, the matte lamination operation including, performing a scan by, controlling the drive unit to first move the recording unit and the curing unit in a main scanning direction, controlling the recording unit to discharge the liquid while the drive unit first moves, and controlling the curing unit to apply the stimulus while the drive unit first moves, and repeating the performing the scan a number of times equal to one less than the determined number of layers before controlling the drive unit to second move the recording unit and the curing unit in a sub-scanning direction perpendicular to the main scanning direction.

12. The image processing device according to claim 1, wherein curing unit includes an irradiator that emits ultraviolet light.

13. The image processing device according to claim 2, wherein the recording unit discharges the liquid in droplets that form dots when cured, each dot having a larger diameter than a distance between adjacent dots on the recording medium.

14. The image processing device according to claim 13, wherein, adjacent dots overlap in an image resulting from the normal lamination operation, and adjacent dots do not overlap in an image resulting from the matte lamination operation.

15. The image processing device according to claim 2, wherein, the recording unit discharges the liquid in droplets that form dots when cured, and an image resulting from the matte lamination operation includes larger grooves between adjacent dots than an image resulting from the normal lamination operation.

16. The image processing device according to claim 15, wherein, the image resulting from the matte lamination operation has a lower gloss level than the image resulting from the normal lamination operation, and an image resulting from the matte lamination operation with the first determined number of layers being three has a lower gloss level than an image resulting from the matte lamination operation with the first determined number of layers being two.

17. The image processing device according to claim 3, wherein the desired gloss level is input to the image processing device from an external source.

18. The image processing device according to claim 5, wherein the at least one processor is further configured to execute the computer-readable instructions to determine an expected gloss level associated with each patch of the plurality of patches based on the parameters corresponding to the respective patch.

19. The image processing device according to claim 18, wherein the at least one processor is further configured to execute the computer-readable instructions to select at least one of the first determined number of layers and the second determined number of layers, based on the expected gloss level associated with each patch of the plurality of patches.

20. The image processing device according to claim 6, wherein the at least one processor is further configured to execute the computer-readable instructions to, determine an expected gloss level associated with each patch of the plurality of patches based on the parameters corresponding to the respective patch; and select at least one of the first determined number of layers and the second determined number of layers, based on the expected gloss level associated with each patch of the plurality of patches.

* * * * *